A. ZOLLER.
Faucet-Attachment for Barrels.
No. 163,717.  Patented May 25, 1875.
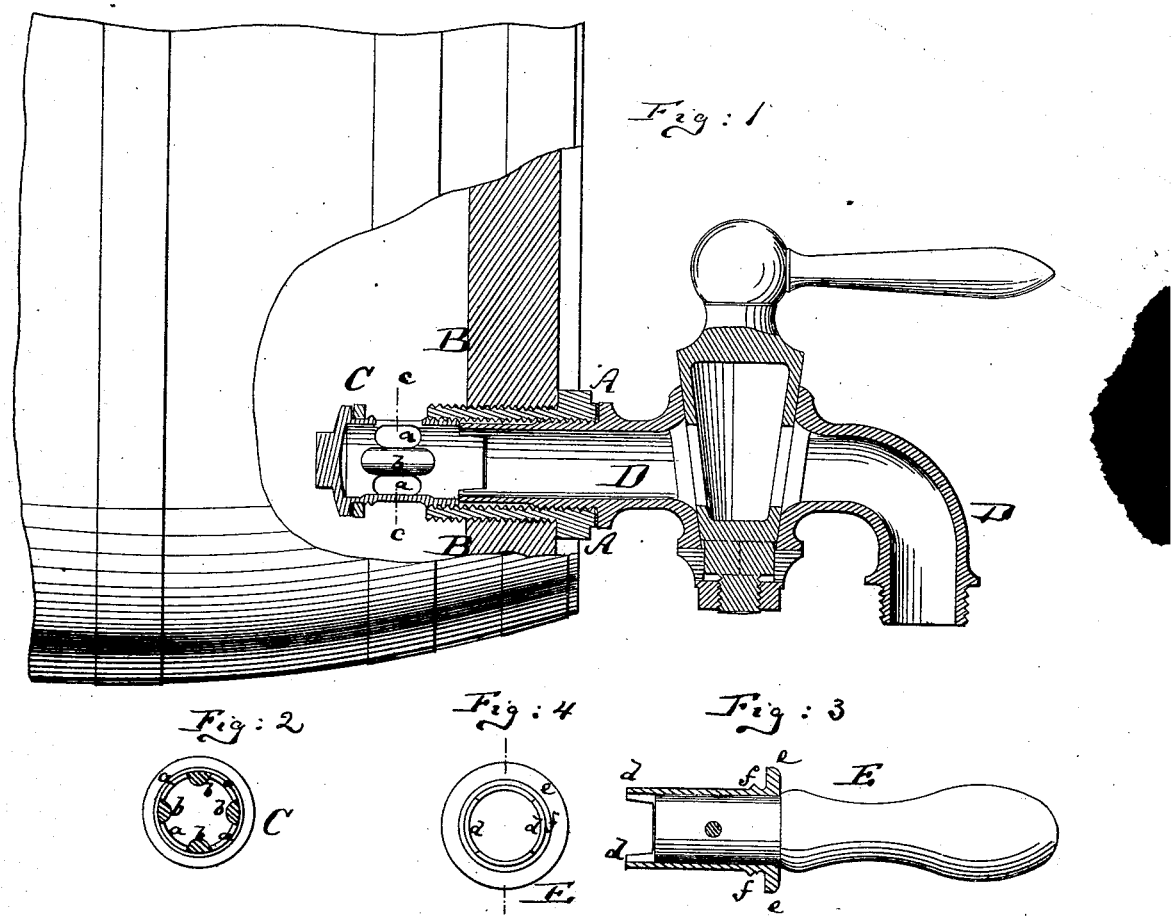
Witnesses:
A. Moraga.
E. C. Webb.
Inventor:
Albert Zoller
by his attorney
A. v. Briesen

UNITED STATES PATENT OFFICE.

ALBERT ZOLLER, OF HOBOKEN, NEW JERSEY.

IMPROVEMENT IN FAUCET ATTACHMENTS FOR BARRELS.

Specification forming part of Letters Patent No. 163,717, dated May 25, 1875; application filed October 15, 1874.

*To all whom it may concern:*

Be it known that I, ALBERT ZOLLER, of Hoboken, in the county of Hudson and State of New Jersey, have invented a new and Improved Faucet Attachment for Beer-Barrels, of which the following is a specification:

Figure 1 represents a longitudinal vertical section of my improved faucet attachment. Fig. 2 is a detail transverse section on the line $c\ c$, Fig. 1. Fig. 3 is a side view, partly in section, of the key which I require for adjusting the valve from the outside; and Fig. 4 is an end view of such key.

Similar letters of reference indicate corresponding parts in all the figures.

This invention has for its object to provide means for adjusting such valves, and more or less opening them without the use of the faucet.

The invention consists in providing a screw-key for operating the valve, and more or less opening it whenever it is desired to have the same opened without the use of the faucet.

In the drawing, the letter A represents the sleeve or bushing, which is screwed into the barrel B, and which contains a hollow screw-valve, C, whereby its inner end can be closed or opened. The valve C is perforated, as shown at $a\ a$, so that when it is screwed back by means of the faucet D, as indicated in Fig. 1, the openings $a$ will admit the beer or other liquid contained in the barrel to the faucet.

In ordinary devices of the kind represented in the drawing the screw-thread of the valve C is continuous, extending even across the parts that remain between the perforations, where it had the tendency to cut the beer before it reached the faucet and agitate it, making it foam more than desirable.

I have attempted to cut away the screw-thread along the perforated portion of the valve C, but find that in so doing I weaken the metal of the tubular valve to such an extent as to make it unreliable, and of insufficient strength. In order to overcome this objection, I cast or form the valve C with inwardly-projecting ribs $b\ b$ between the apertures $a\ a$. These ribs impart the necessary strength to the valve between the apertures $a\ a$, and allow me to cut away the screw on the outside, in the manner clearly indicated in Fig. 1.

Screw-valves of the kind shown are usually operated by the faucet D, which, when it is inserted into the bushing A, screws the valve inward, and admits the beer to the faucet, whereas when the faucet is unscrewed from the bushing it draws the valve in again, and closes the bushing; but frequently it is necessary to open the valve without having the faucet in the bushing—for example, in pitching the barrel, or in emptying it of sediments, or on other similar occasions, all of which require the faucet to be removed, but the valve to be opened. In such cases it has always been inconvenient to an ordinary manipulator to know when the valve was screwed sufficiently far open, so as to avoid the danger of unscrewing it entirely from the bushing, and causing it to drop into the barrel. I have devised a key, E, for this purpose. This key has prongs $d\ d$ at its ends for engaging the outer end of the valve C, in the same manner as is done by the faucet; and the key, furthermore, is of cylindrical form, of such diameter that it may be readily inserted in the bushing to take hold of and turn the valve; but the key has also a flange, $e$, formed on it, and a smaller screw-thread, $f$, in front of such flange, as clearly shown in Fig. 3. This screw-thread allows it to be screwed into the bushing only so far as to cause the flange $e$ to touch the outer end of the bushing, and no farther.

When the key has been turned into the bushing to such an extent that the flange $e$ comes in contact with the bushing the valve C will be screwed inward just far enough to open it, and there is no danger of the valve being screwed inward too far. The key can then be withdrawn without drawing the valve out again from the moment that the screw-thread $f$ leaves the threaded portion of the bushing, and still the key can be used for drawing the valve C outward to its full extent, and closing the bushing entirely.

I claim as my invention—

The key E, provided with the prongs $d$, thread $f$, and flange $e$, for opening and closing the valve C of a barrel, as specified.

ALBERT ZOLLER.

Witnesses:
F. V. BRIESEN,
E. C. WEBB.